2,909,511

OLEFIN POLYMERIZATION PROCESS

Walter William Thomas, Wilmington, Del., assignor to Hercules Powder Company, Wilmington, Del., a corporation of Delaware No Drawing. Application November 20, 1958
Serial No. 775,127

7 Claims. (Cl. 260—93.7)

This invention relates to an improved process for the polymerization of ethylenically unsaturated hydrocarbons and, more particularly, to a modification of the so-called Ziegler-type polymerization process wherein high molecular weight crystalline polymers are selectively produced by an economic and commercially feasible process.

As is now well known, 1-olefins may be polymerized according to the Ziegler process at relatively low temperatures and atmospheric pressure by contacting the olefin with the catalyst produced by mixing a compound of titanium with an organoaluminum compound. An especially effective and practical catalyst for the polymerization of 1-olefins is titanium trichloride activated by an alkylaluminum compound. However, to selectively produce crystalline polymers with little or no amorphous polymer, in the case of propylene and higher 1-olefins, it is necessary to activate the titanium trichloride with either a trialkylaluminum or a dialkylaluminum monohalide. If a monoalkylaluminum dihalide is used as the activator, the polymerization proceeds at extremely low rates, if at all. In the same way, if a mixture of mono- and dialkylaluminum halides, as for example, alkylaluminum sesquihalides, is used, the polymerization also proceeds at very slow rates and the yields are so low that the process is impractical on a commercial scale.

The most economical commercial method of manufacturing aluminum alkyls is by the reaction of aluminum with alkyl halides, usually the chlorides, but the product so obtained is a mixture in practically equal proportions of the mono- and dialkylaluminum halides, which mixtures are commonly known as alkylaluminum sesquihalides. As pointed out above, such mixtures, containing alkylaluminum dihalides, are not useful for the polymerization of propylene and higher olefins. Instead, these mixtures must be fractionated by chemical or physical means to isolate the desired dialkylaluminum halide. Such separation processes add materially to the cost of the aluminum alkyl and, hence, greatly increase the overall cost of the polymerization process.

Now in accordance with this invention it has been found that mixtures of mono- and dialkylaluminum halides may be used directly in the polymerization process, without the necessity of separating the monoalkylaluminum dihalide from the dialkylaluminum halide, by adding to the mixture of mono- and dialkylaluminum halides a halide of a metal of group I–A or II–A of the periodic table prior to use of said mixed alkylaluminum halides in the polymerization process. The polymerization of 1-olefins may then, in accordance with this invention, be carried out by contacting the olefin with the catalyst formed by mixing titanium trichloride with a mixture of mono- and dialkylaluminum halides which has previously been treated with a halide of a metal of group I–A or II–A in an amount equal to at least 0.75 of the stoichiometric equivalent of the monoalkylaluminum halide present.

The salt pretreatment of the mixed alkylaluminum halides may be carried out in a variety of ways. The solid alkali metal halide of alkaline earth metal halide may simply be mixed with the alkylaluminum halide mixture or added to a solution of the alkylaluminum halide mixture in an inert organic diluent such as is used in the polymerization reaction or a suspension of the salt in such a diluent may be added to the alkylaluminum halide mixture or solution thereof. As already stated, the amount of the metal halide added should be an amount equal to at least 0.75 of the stoichiometric equivalent of the monoalkylaluminum halide present or formed during the polymerization reaction. Preferably, an equimolar amount of the salt will be added, or a slight excess of from about 0.1 to 0.2 mol percent over the equimolar amount will be added. Obviously large excesses may be used, but in such a case it may be desirable to separate at least part of the excess by decantation, filtration, etc., prior to use of the alkylaluminum halide in the polymerization reaction, because of reactor efficiency, i.e., space considerations, agitation, etc. The salt may be added to the mixed alkylaluminum halides at room temperature and allowed to stand, but preferably the mixed alkylaluminum halides and salt mixture are heated, as for example, to a temperature of from about 50° C. to about 100° C. for a time, as for example, 0.5 hour to several hours and then used or held at room temperature until desired for use in the polymerization system.

Any halide of a group I–A or II–A metal may be used for pretreating the mixture of alkylaluminum halides used in the polymerization of 1-olefins in accordance with this invention. Exemplary of such salts are the fluorides, chlorides, bromides or iodides of lithium, sodium, potassium, magnesium, calcium, etc. Preferably the salt is in a finely divided form as may be obtained by finely grinding or ball milling the salts.

Any mixture of alkylaluminum halides may be treated with the alkali metal halide or alkaline earth metal halide as described above. Exemplary of such mixtures are the alkylaluminum sesquihalides such as the methylaluminum, ethylaluminum, propylaluminum, butylaluminum, isobutylaluminum, amylaluminum, hexylaluminum, octylaluminum, etc., sesquichlorides, bromides or iodides, etc. In addition to the usual sesquihalides, i.e., the approximately 50:50 mixture of mono- and dialkylaluminum halides, there may be used mixed alkylaluminum halides that may be rich or lean in their content of the monoalkylaluminum dihalide, as for example, mixtures containing 60:40, 70:30, etc., ratios of monoalkyl to dialkyl.

Any 1-olefin, i.e., an ethylenically unsaturated hydrocarbon containing at least 3 carbon atoms and having the double bond in the end position, may be polymerized by the process of this invention, as for example, propylene, butene-1, isobutylene, hexene-1, heptene-1, octene-1, 4- and 5-methylheptene-1, etc., or mixtures of these olefins with themselves or other ethylenically unsaturated hydrocarbons such as ethylene, styrene, α-methylstyrene, vinylcyclohexane, diolefins, etc. The process is of particular importance for the selective polymerization of propylene, butene-1, etc.

The polymerization process may be carried out in any desired fashion by a batchwise or continuous process. Generally it will be carried out in an inert organic liquid diluent as the reaction medium, and particularly in an inert hydrocarbon diluent such as hexane, heptane, cyclohexane, mixtures of such hydrocarbons, etc.

The selection of the temperature and pressure used for the polymerization process will obviously depend upon the monomer, the activity of the catalyst system being used, the degree of polymerization desired, etc. In general, the polymerization will be carried out at room temperature or slightly above, but any temperature within the range of from about —50° C. to about 150° C. and preferably from about 0° C. to about 100° C. may be used. In the same way, while atmospheric pressure or a pressure of only a few pounds may be used, the polymerization may be carried out over a wide range of pressures, as for example, from a partial vacuum to about 1000 lbs. and preferably from about atmospheric to about 500 lbs. pressure. Higher pressures may, of course, be used, but generally do not appreciably alter the course of the polymerization.

In the selective polymerization of 1-olefins to produce predominantly a crystalline polymer, in accordance with this invention, titanium trichloride is preferably used as the transition metal compound in combination with the alkylaluminum sesquihalides. The titanium trichloride may be the so-called authentic titanium trichloride, such as is produced by the reduction of titanium tetrachloride with hydrogen, electrical discharge, etc., or it may be the product produced on reaction of titanium tetrachloride with an organometallic compound of a metal of groups I–A, II–A, or III–A of the periodic table. It is now well accepted that when titanium tetrachloride is reacted with such an organometallic compound, the hydrocarbon-insoluble precipitate which forms when the reaction is carried out in an inert organic diluent is, at least in part, titanium trichloride. However, the crystalline form of this titanium trichloride is different from that produced on hydrogenation of titanium tetrachloride. In any event, either may be used as the catalyst in the polymerization process of this invention and activated with alkylaluminum sesquihalides when the latter have been pretreated with salt.

Any organometallic compound of a metal of groups I–A, II–A or III–A of the periodic table may be used to reduce the titanium tetrachloride to a titanium trichloride useful in the polymerization reaction. Generally the reaction is carried out in an inert organic liquid as diluent such as is used in the polymerization process. The reaction may be carried out at any temperature, but generally is carried out at room temperature or below. The titanium trichloride then separates as a hydrocarbon-insoluble precipitate, which, if desired, may be separated, washed with fresh diluent and then used in the polymerization process. Various other treatments may be applied to it, as for example, heat-treatment prior to or after separation from the diluent, etc. Exemplary of the organometallic compounds that may be used to so reduce the titanium tetrachloride to titanium trichloride are alkali metal alkyls or aryls such as butyllithium, amylsodium, phenylsodium, etc., dimethylmagnesium, diethylmagnesium, diethylzinc, butylmagnesium chloride, phenylmagnesium bromide, triethylaluminum, tripropylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diethylaluminum hydride, ethylaluminum dihydride, diisobutylaluminum hydride, etc., and complexes of such organometallic compounds, as for example, sodium aluminum tetraethyl, lithium aluminum tetraoctyl, etc. The molar ratio of the organometallic compound to the titanium tetrachloride may be varied over a wide range, but there should be used an amount of the organometallic compound that will produce the desired amounts of reduction. Thus, larger ratios of organometallic compound to the transition metal compound are required for alkali metal alkyls than for trialkylaluminum compound, and in the same way more of an alkylaluminum dihalide is required than of a dialkylaluminum monohalide. In general, the molar ratio will be from about 0.1:1 to 100:1 and more usually will be from about 0.3:1 to 10:1.

The polymerization reaction may be carried out in any of the usual manners. Thus the titanium trichloride and the salt pretreated mixture of alkylaluminum halides may be charged with the diluent into the polymerization vessel and the olefin then passed in, or each or both of the catalyst components may be added in increments or continuously throughout the polymerization process. Many other variations may, of course, be used in the process.

The following examples will illustrate the process of this invention. All parts and percentages are by weight unless otherwise indicated.

EXAMPLES 1–6

In each of these examples the ethylaluminum sesquichloride used was a 13.7% solution of the ethylaluminum chlorides in a mixture of inert liquid hydrocarbons, and the weight ratio of monoethylaluminum dichloride to diethylaluminum chloride was 60:40. The titanium trichloride used was prepared by adding the solution of ethylaluminum sesquichlorides to a solution of titanium tetrachloride in the same diluent in an amount such that the molar ratio of diethylaluminum monochloride to titanium tetrachloride was 0.6:1, and after standing for several hours, separating the titanium trichloride precipitate, resuspending the precipitate in fresh diluent and finally heating it for 4 hours at 80° C. The diluent used was a mixture of inert liquid hydrocarbons having a boiling range of about 190–230° C. This same hydrocarbon mixture was used as the diluent for each of the polymerizations, in an amount of about 300 parts.

The salt, sesqui, and diluent were charged to the polymerization vessel and held for 0.5 hour at 50° C. in Example 1 and heated to 80–85° C. with agitation for 1 hour in Example 6. In Example 2 the salt and sesqui were charged to the polymerization vessel and after holding at 50° C. for 0.5 hour, the mixture was diluted with the diluent charge. In the Example 3 series, the salt and sesquichlorides were mixed in the polymerization vessel and held for 6 hours at 50° C. before diluting with the diluent. In Examples 4 and 5, the salt and sesquichlorides were charged to the polymerization vessel and held for 3 hours at 85° C. in Example 4, and at 50° C. in the Example 5, and then were held at 25–30° C. for 16 hours before diluting with the diluent charge. Following the pretreatment of the sesquichlorides with salt, there was then charged to each of the vessels the titanium trichloride suspension and, with the temperature held at about 50° C. in Examples 1–5 and at 80–85° C. in Example 6, propylene was passed in at 15 p.s.i.g. The titanium trichloride was used in an amount of 10 millimoles per liter and the ethylaluminum sesquichloride added as activator was used in an amount that provided 20 millimoles of diethylaluminum chloride per liter of reaction mixture. After 4.5 hours, each of the polymerizations was stopped by ceasing the propylene feed and bleeding off the excess gas. To each was then added an amount of n-butanol equal to 4% of the total volume and the mixture was held for an additional 0.5 hour at the reaction temperature. The polymer slurry obtained in each case was then discharged and weighed, after which the solid polymer was separated by filtration, washed thoroughly with fresh hydrocarbon diluent at 50° C., again filtered and then dried in a vacuum oven at 80–85° C. for 16 hours. The white solid crystalline polypropylene obtained in each case was then determined and from the materials balance of the products recovered, the percent of the total polymer was calculated, as was the rate of formation of the hydrocarbon-insoluble polymer. To the crystalline polypropylenes so obtained in each example there was then added 0.5% by weight of a commercial stabilizer known as Santonox [4,4'-thiobis(6-tert-butyl-m-cresol)] and the polymer was pressed into a film on which the Rockwell hardness and torsional rigidity at 120° C. was determined. The salt and amount, expressed as the mole ratio of salt to ethylaluminum dichloride, used in each of the examples is set forth in the following table along with the rate at which the hydrocarbon-insoluble polymer was formed in grams per liter per hour, the percentage of the total polymer and the torsional rigidity and Rockwell hardness of each of the polymers produced.

Table I

| Ex. No. | Metal Salt | Mole Ratio, Salt: $C_2H_5AlCl_2$ | Rate, g./l./hr. | Percent of Total Polymer | Torsional Rigidity, p.s.i. at 120° C. | Rockwell Hardness |
|---|---|---|---|---|---|---|
| Control | None | ---------- | <6 | (¹) | ---------- | ---------- |
| 1 | NaCl | 19:1 | 23.3 | 98 | 5,810 | 91 |
| 2 | NaCl | 5.3:1 | 14.8 | 99 | 5,780 | 91 |
| 3a | KCl | 2.5:1 | 40.1 | 99 | 5,230 | 86 |
| 3b | NaCl | 2.5:1 | 28.5 | 99 | 4,760 | 87 |
| 3c | NaCl | 12.5:1 | 35.8 | 99 | 4,750 | 86 |
| 4 | KCl | 1.25:1 | 34.5 | 96 | 5,440 | 81 |
| 5a | NaF | 2.5:1 | 17.6 | 91 | 4,370 | 78 |
| 5b | CaCl₂ | 1.25:1 | 18.0 | 90 | 5,370 | 81 |
| 6a | NaCl | 1.34:1 | 32.4 | 90 | 7,350 | 96 |
| 6b | NaCl | 2.5:1 | 37.7 | 97 | 6,250 | 97 |

¹ Yield of polymer too low to determine.

EXAMPLE 7

In this example a commercial titanium trichloride was used in the polymerization of propylene, following the general procedure described in Examples 1–6. In this case the ethylaluminum sesquichloride (60:40) was pretreated with sodium chloride by adding the salt to the sesqui solution in an amount equal to a molar ratio of salt to ethylaluminum dichloride of 1.5:1 and heating the mixture for 2 hours at 90° C. The polymerization was carried out at 50° C. using 10 millimoles of titanium trichloride per liter of reaction mixture and an amount of the salt pretreated sesqui equal to 20 millimoles of diethylaluminum chloride per liter. The rate (g./l./hr.) of formation of the crystalline polypropylene was triple that obtained when the sesquialuminum chloride was not pretreated with salt.

EXAMPLE 8

Butene-1 was polymerized by the general procedure described in Examples 1–6 for propylene, using as catalyst a titanium trichloride prepared as described in those examples except that the molar ratio of diethylaluminum monochloride to titanium tetrachloride was 0.4:1. The same ethylaluminum sesquichloride mixture was used as activator and it was pretreated with sodium chloride by adding an amount of the salt equal to a 1:1 molar ratio of salt to the ethylaluminum dichloride present and heating the mixture at 85° C. for 1.5 hours. The polymerization was carried out at 50° C. using 10 millimoles per liter of the titanium trichloride and an amount of the salt-treated sesqui equal to 20 millimoles per liter of diethylaluminum chloride. Crystalline poly(butene-1) was formed at the rate of 35 g./l./hr. in comparison with 15.5 g./l./hr. for the control where the sesqui activator was not treated with salt. The RSV (reduced specific viscosity as measured on an 0.1% solution in decalin at 135° C.) was 4.0 and melting point, 114° C. in comparison with 3.7 and 113° C., respectively, for the control.

From the foregoing examples it is readily apparent that the salt pretreatment of the mixed alkylaluminum halides makes it possible to use them for the activation of titanium trichloride in the polymerization of olefins and obtain greatly improved rates of polymerization and/or improved yields of crystalline polymer. Another advantage of the process of this invention is that the polymer so produced has greatly improved physical properties. Thus, by means of the process of this invention it has been possible to produce crystalline polypropylene, in high yield and at a high degree of polymerization, that have exceptional physical properties and in particular with crystalline polypropylene having a very high torsional rigidity.

What I claim and desire to protect by Letters Patent is:

1. The process of polymerizing a 1-olefin which comprises contacting said olefin with at least a catalytic amount of a catalyst, formed by mixing titanium trichloride with a mixture of mono- and dialkylaluminum halides, said mixture of alkylaluminum halides having been pretreated with a halide of a metal selected from the group consisting of groups I-A and II-A of the periodic table in an amount of at least about 0.75 mole per mole of monoalkylaluminum halide in the said mixture of alkylaluminum halides.

2. The process of claim 1 wherein the 1-olefin is homopolymerized.

3. The process of claim 1 wherein the 1-olefin is copolymerized with at least one other ethylenically unsaturated hydrocarbon.

4. The process of claim 2 wherein the 1-olefin is propylene.

5. The process of claim 4 wherein the mixture of mono- and dialkylaluminum halides is a mixture of mono- and diethylaluminum chlorides.

6. The process of polymerizing propylene which comprises contacting propylene with at least a catalytic amount of a catalyst, formed by mixing titanium trichloride with ethylaluminum sesquichloride, said ethylaluminum sesquichloride being admixed with sodium chloride in an amount of at least about 0.75 mole per mole of ethylaluminum dichloride in the said ethylaluminum sesquichloride.

7. The process of polymerizing propylene which comprises contacting propylene with at least a catalytic amount of a catalyst, formed by mixing titanium trichloride with ethylaluminum sesquichloride, said ethylaluminum sesquichloride being admixed with potassium chloride in an amount of at least about 0.75 mole per mole of ethylaluminum dichloride in the said ethylaluminum sesquichloride.

References Cited in the file of this patent

UNITED STATES PATENTS

| | | |
|---|---|---|
| 2,840,551 | Field et al. | June 24, 1958 |
| 2,846,427 | Findlay | Aug. 5, 1958 |